United States Patent
Hayashi et al.

(10) Patent No.: US 11,292,369 B2
(45) Date of Patent: Apr. 5, 2022

(54) SEAT APPARATUS (71) Applicant: SHIROKI CORPORATION, Fujisawa (JP)

(72) Inventors: Naoki Hayashi, Fujisawa (JP); Yuki Abe, Fujisawa (JP)

(73) Assignee: SHIROKI CORPORATION, Fujisawa (JP)

( * ) Notice: Subject to any disclaimer, the term of this patent is extended or adjusted under 35 U.S.C. 154(b) by 0 days.

(21) Appl. No.: 17/314,479

(22) Filed: May 7, 2021

(65) Prior Publication Data
US 2021/0370806 A1 Dec. 2, 2021

(30) Foreign Application Priority Data
May 28, 2020 (JP) .............................. JP2020-092927

(51) Int. Cl.
*B60N 2/16* (2006.01)
*B60N 2/015* (2006.01)
*B60N 2/12* (2006.01)
*B60N 2/02* (2006.01)

(52) U.S. Cl.
CPC .......... *B60N 2/1615* (2013.01); *B60N 2/0232* (2013.01)

(58) Field of Classification Search
CPC ... B60N 2/1615; B60N 2/0232; B60N 2/4263
See application file for complete search history.

(56) References Cited

U.S. PATENT DOCUMENTS

| 5,575,531 | A  | * | 11/1996 | Gauger    | B60N 2/0232 248/429 |
| 5,697,674 | A  | * | 12/1997 | Aufrere   | B60N 2/1615 297/284.2 |
| 10,486,559 | B2 | * | 11/2019 | Matsui    | B60N 2/1615 |
| 2005/0134100 | A1 | * | 6/2005 | Canteleux | B60R 22/26 297/344.15 |
| 2006/0152048 | A1 | * | 7/2006 | Kamei     | B60N 2/4263 297/216.1 |
| 2012/0139306 | A1 | * | 6/2012 | Jeong     | B60N 2/167 297/216.1 |

(Continued)

FOREIGN PATENT DOCUMENTS

JP 2006192986 A 7/2006

*Primary Examiner* — Shin H Kim
(74) *Attorney, Agent, or Firm* — Buchanan Ingersoll & Rooney PC (57) ABSTRACT

A seat apparatus includes plural links configured to be attached to a base member, a seat cushion frame supported by the links, and a connecting member. The seat cushion frame includes a pair of side walls connected by the connecting member, and a contact portion on at least one of the pair of side walls. At least one of the links includes a first end portion, a second end portion, and a projecting portion projecting from the second end portion. The first end portion is rotatably connectable to the base member directly or indirectly about a first rotation axis, the second end portion is rotatably connectable to the side wall directly or indirectly about a second rotation axis, and the projecting portion is configured such that at least when the seat cushion frame is moved to the highest position, a predetermined portion of the projecting portion faces the contact portion.

7 Claims, 5 Drawing Sheets

(56) References Cited

U.S. PATENT DOCUMENTS

| | | | | |
|---|---|---|---|---|
| 2012/0153658 A1* | 6/2012 | Kanda | ............... | B60N 2/682 |
| | | | | 296/65.13 |
| 2012/0212014 A1* | 8/2012 | Arata | ............... | B60N 2/1615 |
| | | | | 297/216.1 |
| 2012/0212015 A1* | 8/2012 | Ozawa | ............... | B60N 2/165 |
| | | | | 297/216.1 |
| 2013/0200677 A1* | 8/2013 | Hoshi | ............... | B60N 2/682 |
| | | | | 297/344.15 |
| 2015/0307006 A1* | 10/2015 | Hayashi | ............... | B60N 2/68 |
| | | | | 297/344.13 |
| 2017/0028878 A1* | 2/2017 | Nakagawa | ............... | B60N 2/90 |
| 2018/0009338 A1* | 1/2018 | Kim | ............... | B60N 2/1615 |
| 2018/0334056 A1* | 11/2018 | Nagatani | ............... | B60N 2/1615 |
| 2018/0339611 A1* | 11/2018 | Matsui | ............... | B60N 2/0732 |
| 2019/0061568 A1* | 2/2019 | Hirata | ............... | B60N 2/1615 |
| 2019/0152352 A1* | 5/2019 | Handigol | ............... | B60N 2/1695 |
| 2019/0291609 A1* | 9/2019 | Mike | ............... | B60N 2/1615 |
| 2019/0308527 A1* | 10/2019 | Nakamura | ............... | B60N 2/161 |
| 2020/0282885 A1* | 9/2020 | Onuma | ............... | B60N 2/1615 |
| 2020/0284330 A1* | 9/2020 | Kajino | ............... | F16H 31/002 |
| 2020/0391622 A1* | 12/2020 | Kajino | ............... | B60N 2/0232 |
| 2021/0129713 A1* | 5/2021 | Kajino | ............... | B60N 2/1685 |
| 2021/0229573 A1* | 7/2021 | Fischer | ............... | B60N 2/1615 |
| 2021/0309128 A1* | 10/2021 | Jung | ............... | B60N 2/0232 |

* cited by examiner

FIG. 1

REAR ←—→ FRONT
     DY

REAR ←→ FRONT
DY

SEAT APPARATUS

CROSS-REFERENCE TO RELATED APPLICATION

This application claims priority from Japanese Patent Application No. 2020-092927 filed with the Japan Patent Office on May 28, 2020, the entire content of which is hereby incorporated by reference.

BACKGROUND

1. Technical Field

The present disclosure relates to a seat apparatus.

2. Related Art

JP-A-2006-192986 discloses a seat apparatus provided in a vehicle. The seat apparatus described in JP-A-2006-192986 has a lifter structure. The seat apparatus includes a pair of front links and a pair of rear links, and a seat cushion frame supported by the pair of front links and the pair of rear links. The seat cushion frame is raised and lowered by operation of the pair of front links and the pair of rear links.

SUMMARY

A seat apparatus according to an embodiment of the present disclosure includes: a plurality of links configured to be attached to a base member; a seat cushion frame supported by the plurality of links; and a connecting member. In the seat apparatus, the seat cushion frame includes, a pair of side walls connected by the connecting member, and a contact portion provided on at least one of the pair of side walls, at least one of the plurality of links includes a first end portion, a second end portion, and a projecting portion projecting from the second end portion, the first end portion is configured to be rotatably connected to the base member directly or indirectly about a first rotation axis, the second end portion is configured to be rotatably connected to the side wall directly or indirectly about a second rotation axis, and the projecting portion is configured such that at least when the seat cushion frame is moved to the highest position, a predetermined portion of the projecting portion faces the contact portion.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

By the way, a large load may be applied to a seat cushion frame due to a vehicle collision. When the large load is applied to the seat cushion frame in this way, the seat cushion frame may be deformed. Therefore, a seat apparatus capable of suppressing deformation of the seat cushion frame is provided.

(1) A seat apparatus which solves the above-described problem includes: a plurality of links configured to be attached to a base member; a seat cushion frame supported by the plurality of links; and a connecting member. In the seat apparatus, the seat cushion frame includes, a pair of side walls connected by the connecting member, and a contact portion provided on at least one of the pair of side walls, at least one of the plurality of links includes a first end portion, a second end portion, and a projecting portion projecting from the second end portion, the first end portion is configured to be rotatably connected to the base member directly or indirectly about a first rotation axis, the second end portion is configured to be rotatably connected to the side wall directly or indirectly about a second rotation axis, and the projecting portion is configured such that at least when the seat cushion frame is moved to the highest position, a predetermined portion of the projecting portion faces the contact portion.

According to this configuration, at least when the seat cushion frame is disposed at the highest position, the projecting portion of the link is disposed near the contact portion of the seat cushion frame. Therefore, when the seat cushion frame sinks due to the vehicle collision, the contact portion provided on the side wall contacts the projecting portion of the link and is supported by the projecting portion. As a result, deformation of the side wall is suppressed. In this way, the deformation of the seat cushion frame can be suppressed.

(2) In the seat apparatus, the projecting portion projects to intersect a straight line connecting the first rotation axis and the second rotation axis.

According to this configuration, the projecting portion is smaller than a projecting portion projecting over an entire circumference of the circle centered on the second rotation axis. Therefore, a weight increase of the link can be suppressed.

(3) In the seat apparatus, a gap is provided between the projecting portion of the link and the side wall of the seat cushion frame.

When the projecting portion of the link is configured to contact the side wall of the seat cushion frame, the projecting portion faces a corner portion between the side wall and the contact portion. In such a configuration, when the seat cushion frame sinks due to the vehicle collision, the contact portion may not be sufficiently supported by the link. In this respect, according to the above configuration, the projecting portion supports the contact portion at a position away from the side wall of the seat cushion frame. This makes it possible to prevent the contact portion from not being supported by the link.

(4) In the seat apparatus, when the seat cushion frame is disposed at the highest position, a predetermined portion of the projecting portion of the link is closest to the contact portion, and a gap is generated between an end surface of the projecting portion and the contact portion.

In a structure in which the end surface of the projecting portion contacts the contact portion when the seat cushion frame is disposed at the highest position, a reaction force of the load applied to the seat cushion frame may be directly applied to an occupant. In this respect, according to the above configuration, the side wall and the contact portion are allowed to be deformed by the gap provided between the end surface of the projecting portion and the contact portion. Thus, the load applied to the seat cushion frame is damped by the deformation of the seat cushion frame. Then, the reaction force of the load is also reduced. In this way, it is possible to mitigate the impact applied to the occupant.

(5) In the seat apparatus, an end surface of the projecting portion of the link is made of a curved surface including a part of a circumference of a circle centered on the second rotation axis.

According to this configuration, in raising and lowering of the seat cushion frame, it is possible to extend a range in which a distance between the end surface of the projecting portion and the contact portion is constant. Thus, it is possible to obtain an effect of suppressing the deformation of the seat cushion frame due to the contact between the contact portion and the projecting portion over a predetermined range in the raising and lowering of the seat cushion frame.

The seat apparatus can suppress the deformation of the seat cushion frame.

The seat apparatus will be described with reference to FIGS. 1 to 8. In the present embodiment, a front-rear direction DY is set based on front and rear of a seat 2. A width direction DW indicates a direction that intersects the front-rear direction DY perpendicularly. An inward direction DA indicates a direction toward an intermediate line CM of a pair of rails 10 in the width direction DW (see FIGS. 7 and 8).

The seat apparatus 1 is an apparatus that raises and lowers the seat 2 of a vehicle. The seat 2 includes a seat cushion 3 and a seat back 4 provided at a rear portion of the seat cushion 3. The seat apparatus 1 is attached to a base member 6 of a base apparatus 5. The base apparatus 5 is fixed to a vehicle floor 8. The seat 2 is mounted on the base apparatus 5. Examples of the base apparatus 5 include a slide apparatus 7 or a rotating apparatus. The slide apparatus 7 moves the seat 2 in the front-rear direction DY. The rotating apparatus can rotate the seat 2 about a line intersecting the vehicle floor 8. The base apparatus 5 may include both the slide apparatus 7 and the rotating apparatus. In this embodiment, the seat apparatus 1 is attached to the slide apparatus 7.

Figure 2:
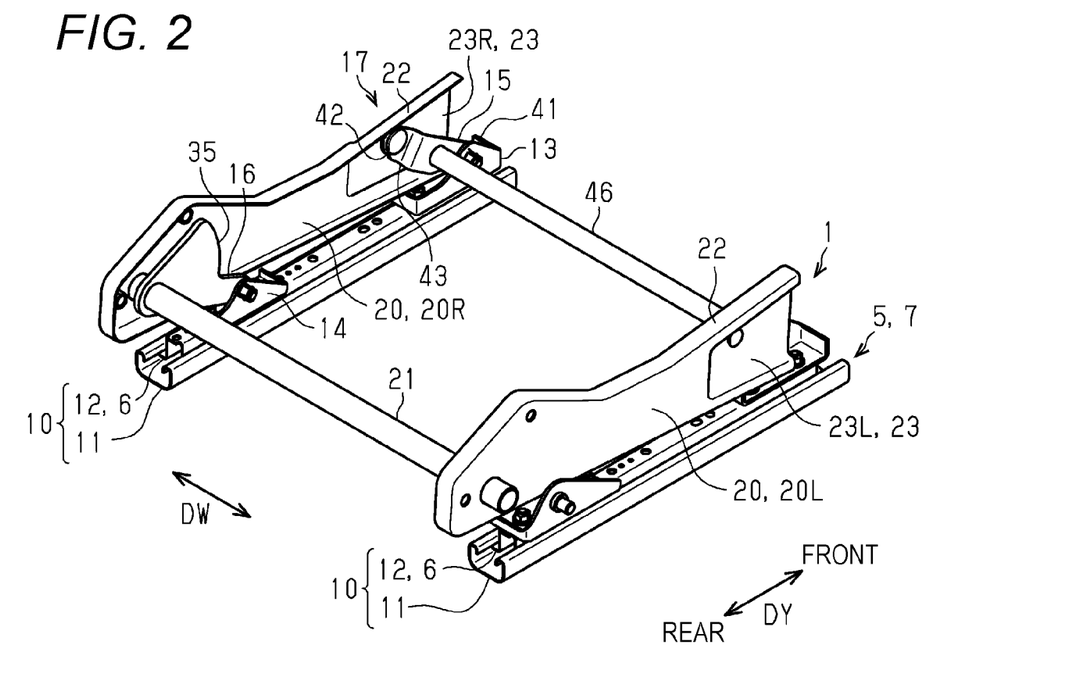
FIG. 2 is a perspective view of the seat apparatus and the slide apparatus.

As illustrated in FIG. 2, the slide apparatus 7 includes two rails 10 arranged in the width direction DW of the vehicle. The rail 10 includes a lower rail 11 and an upper rail 12 provided on the lower rail 11 so as to be movable in the front-rear direction DY. In this embodiment, a pair of upper rails 12 is the "base member 6". The seat apparatus 1 is attached to the pair of upper rails 12 as the base member 6 via a bracket.

Figure 1:
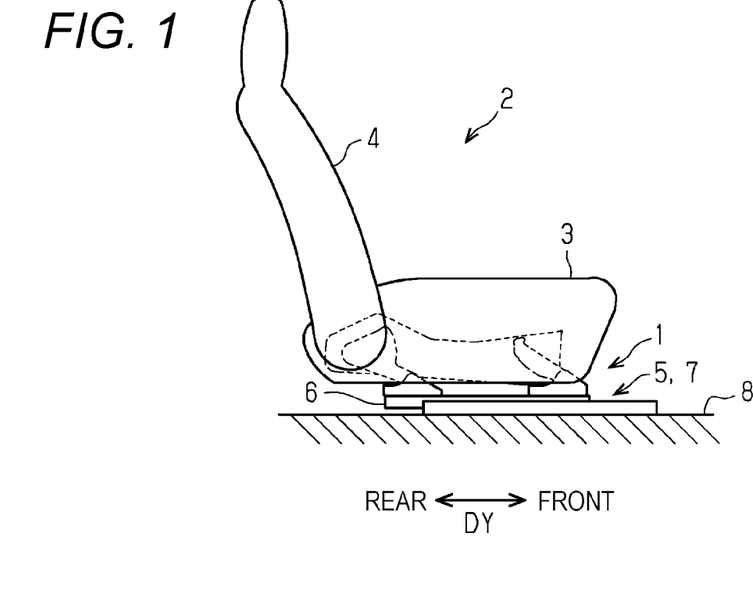
FIG. 1 is a schematic view of a seat, a seat apparatus, and a slide apparatus.

As illustrated in FIGS. 1 and 2, the seat apparatus 1 includes a plurality of links and a seat cushion frame 17 supported by the plurality of links. The plurality of links is configured to be attached to the pair of upper rails 12 as the base member 6. In this embodiment, a front portion of the seat cushion frame 17 is supported by a pair of links on a front side. A rear portion of the seat cushion frame 17 is supported by a pair of links on a rear side. Hereinafter, the link on the front side is referred to as a "front link 15". The link on the rear side is referred to as a "rear link 16". In this embodiment, the seat apparatus 1 includes a pair of front links 15 configured to be attached to the pair of upper rails 12 as the base member 6, a pair of rear links 16 configured to be provided on the pair of upper rails 12 as the base member 6, and the seat cushion frame 17.

Figure 3:
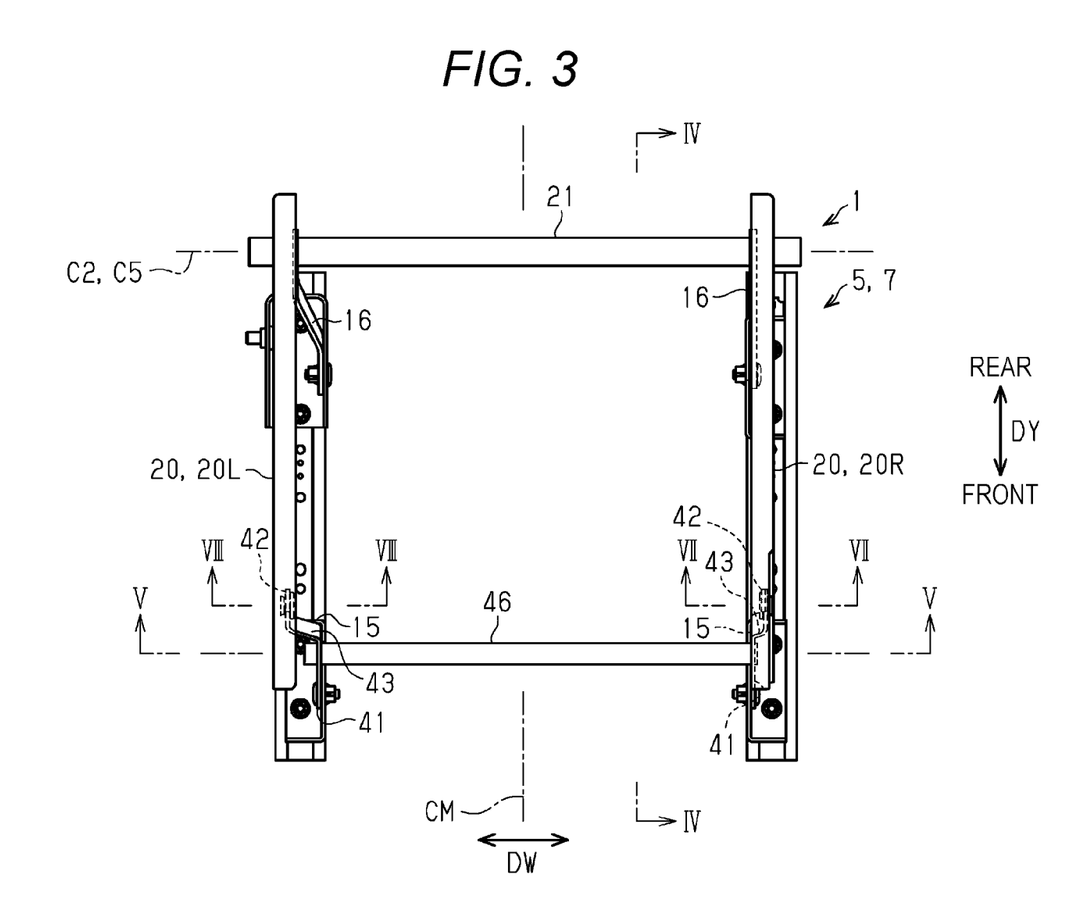
FIG. 3 is a plan view of the seat apparatus and the slide apparatus.

As illustrated in FIG. 3, the seat cushion frame 17 includes a pair of side walls 20 connected by the rear connecting member 21. The seat cushion frame 17 may include a support member that supports a cushion pad. The side wall 20 is disposed above the upper rail 12. The side wall 20 extends in the front-rear direction DY. The rear connecting member 21 is disposed between the pair of side walls 20 to connect rear portions of the pair of side walls 20. The side wall 20 is provided with a mounting portion 23 on which a second end portion 42 of the front link 15 is mounted (see FIGS. 2 and 5).

The seat cushion frame 17 further includes a contact portion 22. The contact portion 22 is provided on each of the pair of side walls 20. The contact portion 22 is provided on an upper end of the side wall 20 so as to extend in the front-rear direction DY. The contact portion 22 projects in the inward direction DA from the mounting portion 23 (see FIGS. 7 and 8). Preferably, the contact portion 22 is integrally formed with the side wall 20. In an example, the contact portion 22 is an upper portion of the curved side wall 20.

As illustrated in FIG. 2, the seat cushion frame 17 is supported by the pair of front links 15 and the pair of rear links 16. The front portion of the seat cushion frame 17 is supported by the pair of front links 15. The rear portion of the seat cushion frame 17 is supported by the pair of rear links 16.

Figure 4:
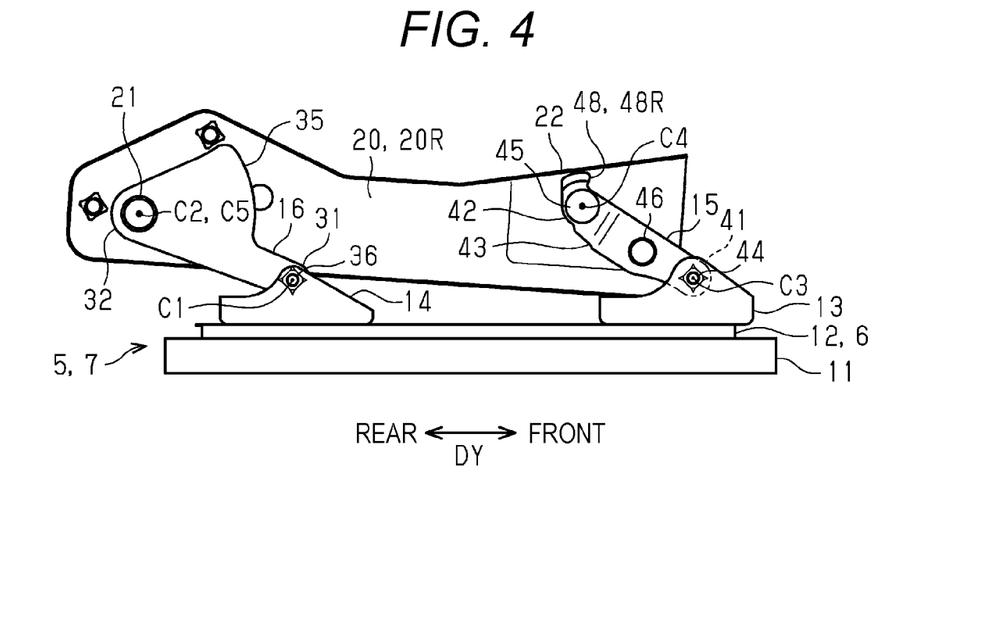
FIG. 4 is a cross-sectional view of the seat apparatus taken along a line IV-IV of FIG. 3.

As illustrated in FIG. 4, each of the pair of rear links 16 includes a first end portion 31 and a second end portion 32. The pair of rear links 16 is configured to work together. The first end portion 31 of the rear link 16 is configured to be rotatably connected to the upper rail 12 directly or indirectly about a first rear rotation axis C1. In this embodiment, the first end portion 31 of the rear link 16 is configured to be connected to a rear portion of the upper rail 12 via a rear bracket 14. Specifically, the first end portion 31 of the rear link 16 is connected to the rear bracket 14 via a first shaft member 36 having the first rear rotation axis C1. The rear link 16 is rotatable about the first rear rotation axis C1 with respect to the upper rail 12.

The second end portion 32 of the rear link 16 is rotatably connected to the side wall 20 directly or indirectly about a second rear rotation axis C2. In this embodiment, the second end portion 32 of the rear link 16 is connected to the side wall 20 via the rear connecting member 21. The second rear rotation axis C2 is aligned with a central axis C5 of the rear connecting member 21. The rear link 16 is rotatable about the central axis C5 of the rear connecting member 21 with respect to the rear connecting member 21.

As illustrated in FIG. 4, one of the pair of rear links 16 is provided with a gear 35. The gear 35 has a plurality of teeth. The plurality of teeth is arranged along a circle centered on the second rear rotation axis C2. The gear 35 is configured to mesh with a drive gear (not shown) that transmits a power of a motor. A drive apparatus including the drive gear is attached to the seat cushion frame 17. The drive gear is disposed at a position away from the second rear rotation axis C2 by a predetermined distance. The power is transmitted to the gear 35 by rotation of the drive gear. Then, the rear link 16 rotates with respect to the side wall 20. As the pair of rear links 16 rotates, the pair of front links 15 also rotates. In this way, the seat cushion frame 17 is raised and lowered.

Figure 5:
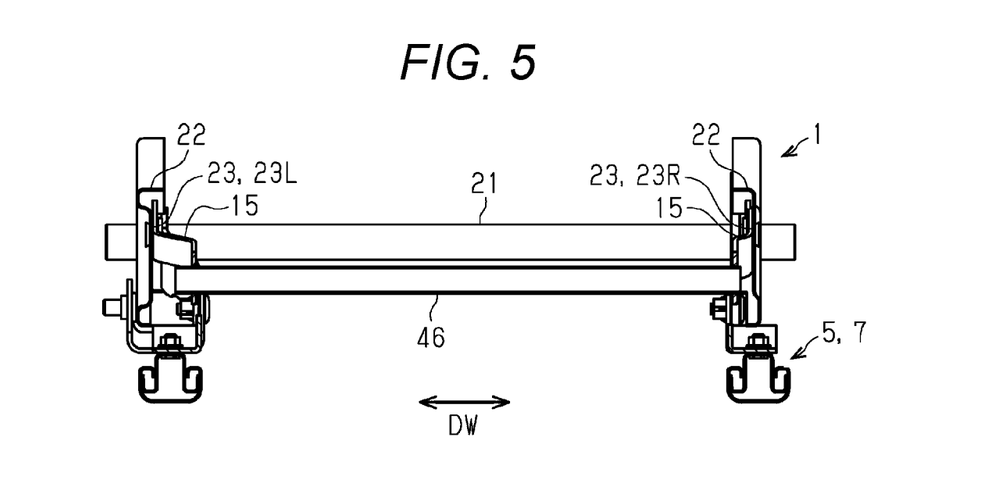
FIG. 5 is a cross-sectional view of the seat apparatus taken along a line V-V of FIG. 3.

As illustrated in FIGS. 3 and 5, the front connecting member 46 connects the pair of front links 15. A distance between the pair of front links 15 is defined by the front connecting member 46. The pair of front links 15 is configured to work together.

As illustrated in FIG. 4, each of the pair of front links 15 includes a first end portion 41 and a second end portion 42. In the front link 15, a step portion 43 is provided between the first end portion 41 and the second end portion 42. In this embodiment, a portion from the first end portion 41 to the step portion 43 is disposed inside (on the intermediate line CM side of) the second end portion 42 (see FIG. 3).

The first end portion 41 of the front link 15 is configured to be rotatably connected to the upper rail 12 directly or indirectly about a first front rotation axis C3. In this embodiment, the first end portion 41 of the front link 15 is configured to be connected to a front portion of the upper rail 12 via a front bracket 13. Specifically, the first end portion 41 of the front link 15 is connected to the front bracket 13 via a second shaft member 44 having the first front rotation axis C3. The front link 15 is rotatable with respect to the upper rail 12 about the first front rotation axis C3.

The second end portion 42 of the front link 15 is rotatably connected to the side wall 20 directly or indirectly about a second front rotation axis C4. In this embodiment, the second end portion 42 of the front link 15 is directly connected to the mounting portion 23 of the side wall 20. Specifically, the second end portion 42 of the front link 15 is connected to the mounting portion 23 of the side wall 20 via a third shaft member 45 having the second front rotation axis C4. The front link 15 is rotatable about the second front rotation axis C4 with respect to the side wall 20.

Figure 6:
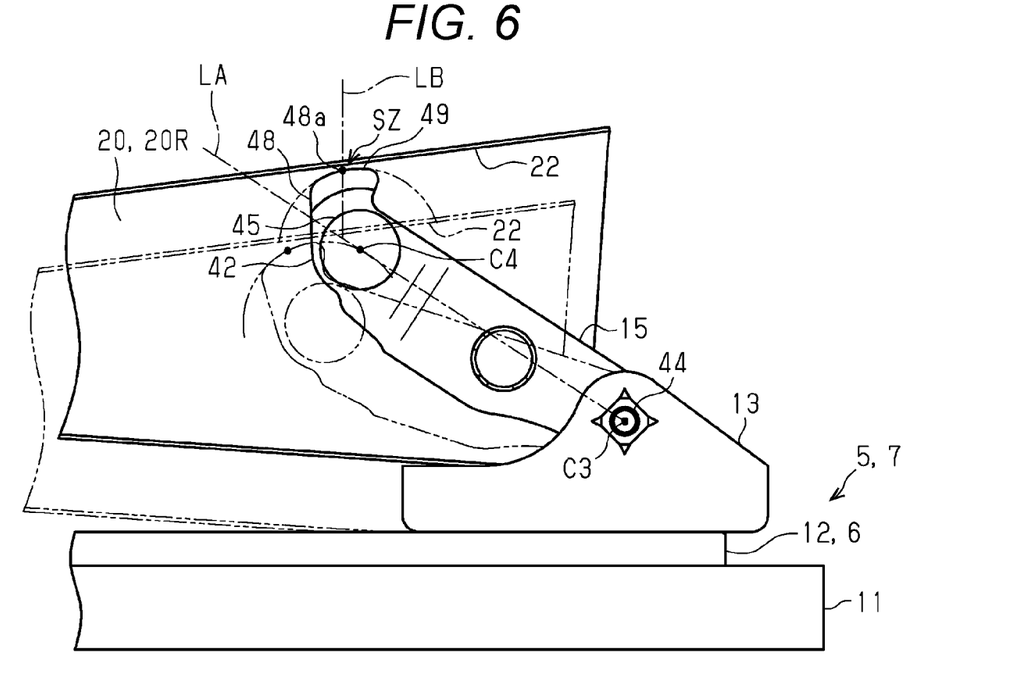
FIG. 6 is a cross-sectional view of the seat apparatus illustrating a raising and lowering operation of the seat apparatus.

As illustrated in FIG. 6, each of the pair of front links 15 includes a projecting portion 48 projecting from the second end portion 42. In FIG. 6, the side wall 20 when the seat cushion frame 17 is disposed at the highest position is illustrated by solid lines. The side wall 20 when the seat cushion frame 17 is lowered from the highest position to a predetermined position is illustrated by two-dot chain lines.

The projecting portion 48 is configured such that when the seat cushion frame 17 is moved to the highest position, a predetermined portion 48a of the projecting portion 48 faces the contact portion 22. Preferably, the projecting portion 48 is configured such that when the seat cushion frame 17 is disposed at the highest position, the predetermined portion 48a is located closer to the contact portion 22 than a peripheral portion of the predetermined portion 48a of the projecting portion 48, and faces the contact portion 22.

In this embodiment, the projecting portion 48 of the second end portion 42 projects to intersect a straight line LA connecting the first front rotation axis C3 and the second front rotation axis C4. Specifically, a center line LB of the projecting portion 48 intersects the straight line LA. More preferably, the projecting portion 48 is configured such that when the seat cushion frame 17 is disposed at the highest position, the predetermined portion 48a of the projecting portion 48 is closest to the contact portion 22 and a gap SZ is generated between the predetermined portion 48a of the projecting portion 48 and the contact portion 22. Further preferably, an end surface 49 of the projecting portion 48 of the front link 15 includes a curved surface including a part of a circumference of a circle centered on the second front rotation axis C4.

Further, gaps SA and SB are provided between the projecting portion 48 of the front link 15 and the side wall 20 of the seat cushion frame 17. Each of the front link 15 on a right side and the front link 15 on a left side of the seat apparatus 1 when viewed from a front will be described.

Figure 7:
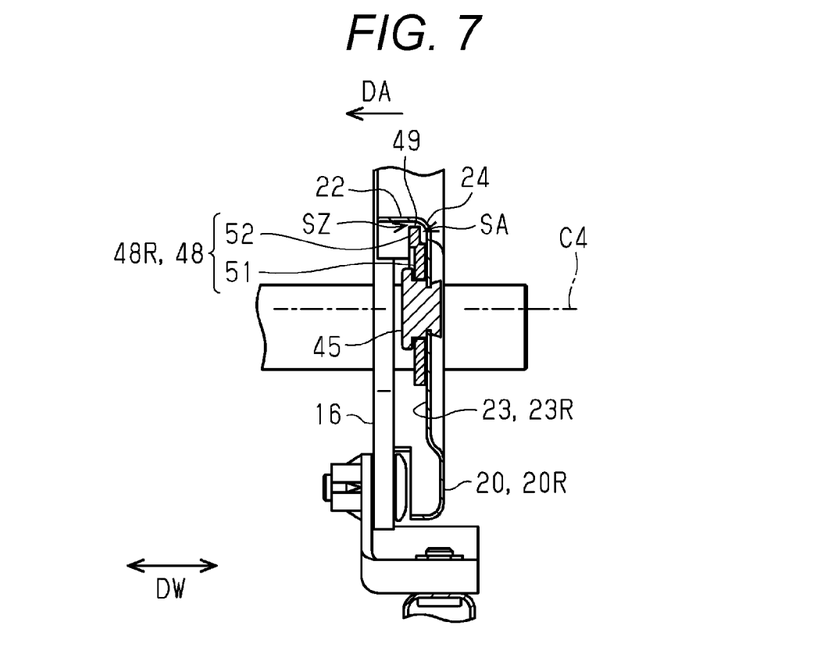
FIG. 7 is a cross-sectional view of the seat apparatus taken along a line VII-VII of FIG. 3.

FIG. 7 illustrates the front link 15 and a side wall 20R on the right side of the seat apparatus 1 when the seat 2 is viewed from the front. A mounting portion 23R of the side wall 20R on the right side extends in a vertical direction. The contact portion 22 is provided on an upper portion of the mounting portion 23R. The contact portion 22 is connected to the mounting portion 23R via a curved portion 24. The second end portion 42 of the front link 15 on the right side is in contact with the mounting portion 23R of the side wall 20R. A projecting portion 48R on the right side includes a first extension portion 51 extending from the second end portion 42 and a second extension portion 52 further extending from the first extension portion 51. The second extension portion 52 is disposed inside the width direction DW from the first extension portion 51. The gap SA is provided between the mounting portion 23R and the second extension portion 52 of the projecting portion 48R. The second extension portion 52 is disposed in a portion inside a maximum curvature portion of the curved portion 24 in the width direction DW. The curved portion 24 has the highest curvature at the maximum curvature portion.

Figure 8:
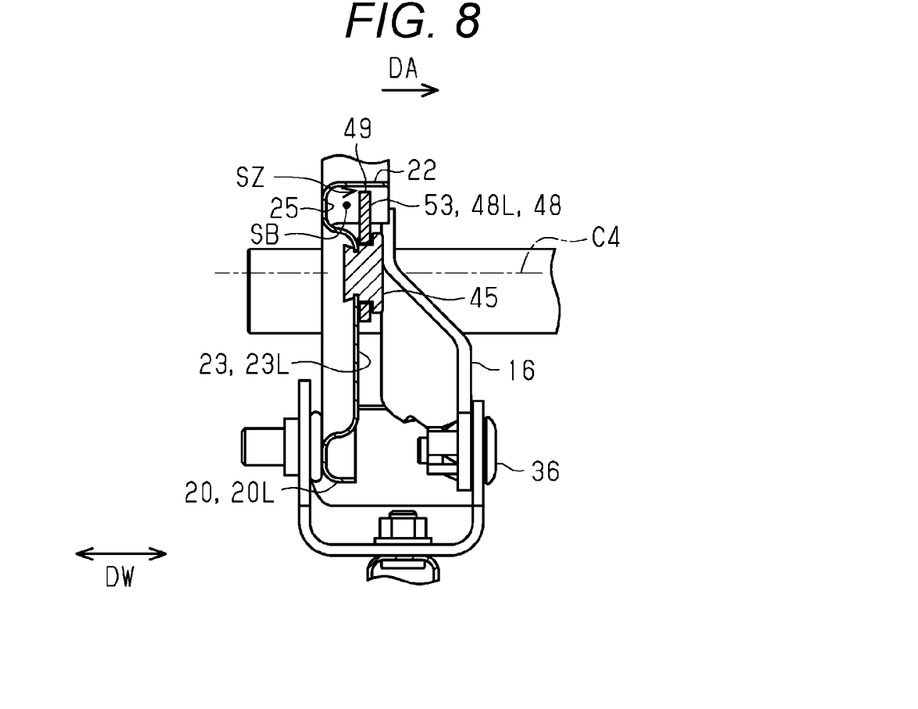
FIG. 8 is a cross-sectional view of the seat apparatus taken along a line VIII-VIII of FIG. 3.

FIG. 8 illustrates the front link 15 and a side wall 20L on the left side of the seat apparatus 1 when the seat 2 is viewed from the front. A mounting portion 23L of the left side wall 20L projects inward in the width direction the DW from a periphery of the mounting portion 23L. The contact portion 22 is provided above the mounting portion 23L via a recess 25 provided in an upper portion of the mounting portion 23L. The second end portion 42 of the front link 15 on the left side is in contact with the mounting portion 23L of the side wall 20L. A left projecting portion 48L includes an extension portion 53 extending from the second end portion 42. The gap SB is provided between the side wall 20L (recess 25) on the left side and the extension portion 53 of the projecting portion 48L. Preferably, the extension portion 53 extends perpendicular to the contact portion 22.

An operation of this embodiment will be described.

At the time of a head-on collision of the vehicle, a large load may be applied to a front portion of the seat cushion 3 due to downward sliding of a lower body of the occupant. At this time, due to the large load applied to the front portion of the seat cushion frame 17, both side walls 20 may fall inward. Specifically, when the seat cushion frame 17 is disposed at the highest position, the load applied to the front portion of the seat cushion 3 is large. If the side wall 20 of the seat cushion frame 17 is deformed, the seat 2 may not be able to move. In that case, it is difficult to escape the occupant from the vehicle.

In this embodiment, the front link 15 suppresses deformation of the front portion of the seat cushion frame 17. Specifically, the contact portion 22 is provided on the upper portion of the side wall 20 of the seat cushion frame 17. The contact portion 22 is configured to be supported from below by the front link 15 when the load is applied to the seat cushion frame 17 and the seat cushion frame 17 sinks. The front link 15 is provided with a projecting portion 48 that can contact the contact portion 22. When the seat cushion frame 17 is disposed at the highest position, the projecting portion 48 is disposed so that a predetermined position of the projecting portion 48 is directly below the contact portion 22. At the time of the head-on collision of the vehicle, a large downward load is applied to the front portion of the seat cushion frame 17. As a result, the both side walls 20 fall inward. At this time, the contact portion 22 provided on the upper portion of the side wall 20 contacts the projecting portion 48 of the front link 15. In this way, the upper portion of the side wall 20 is supported from below by the front link 15. This suppresses deformation of the side wall 20.

An effect of this embodiment will be described.

(1) In the seat apparatus 1, the contact portion 22 is provided on each of the pair of side walls 20. Each of the pair of front links 15 includes the first end portion 41, the second end portion 42, and the projecting portion 48 projecting from the second end portion 42. The projecting portion 48 is configured such that when the seat cushion frame 17 is moved to the highest position, the predetermined portion 48a of the projecting portion 48 faces the contact portion 22.

According to this configuration, when the seat cushion frame 17 is disposed at the highest position, the projecting portion 48 of the front link 15 is disposed near the contact portion 22 of the seat cushion frame 17. Therefore, when the seat cushion frame 17 sinks due to the vehicle collision, the contact portion 22 provided on the side wall 20 contacts the projecting portion 48 of the front link 15. In this way, the side wall 20 is supported by the projecting portion 48. As a result, the deformation of the side wall 20 is suppressed. In this way, the deformation of the seat cushion frame 17 can be suppressed.

(2) The projecting portion 48 of the second end portion 42 preferably projects to intersect the straight line LA connecting the first front rotation axis C3 and the second front rotation axis C4. According to this configuration, the projecting portion 48 is smaller than a projecting portion 48 projecting over the entire circumference of the circle centered on the second front rotation axis C4. Therefore, the weight increase of the front link 15 can be suppressed.

(3) Preferably, the gaps SA and SB are provided between the projecting portion 48 of the front link 15 and the side wall 20 of the seat cushion frame 17.

The projecting portion 48 of the front link 15 is configured to contact the side wall 20 of the seat cushion frame 17. In this case, the projecting portion 48 faces the corner portion (that is, the maximum curvature portion of the curved portion 24) between the side wall 20 and the contact portion 22. In such a configuration, when the seat cushion frame 17 sinks due to the vehicle collision, the projecting portion 48 contacts the corner portion (maximum curvature portion of the curved portion 24). Thus, the contact portion 22 may be bent inward before the load is sufficiently transmitted to the front link 15. In this case, the contact portion 22 is not sufficiently supported by the front link 15. In this respect, according to the above configuration, the projecting portion 48 supports the contact portion 22 at a position away from the side wall 20 of the seat cushion frame 17. This makes it possible to prevent the contact portion 22 from not being supported by the front link 15.

(4) Preferably, when the seat cushion frame 17 is disposed at the highest position, the predetermined portion 48a of the projecting portion 48 of the front link 15 is closest to the contact portion 22, and the gap SZ is generated between the end surface 49 of the projecting portion 48 and the contact portion 22.

In a structure in which the end surface 49 of the projecting portion 48 contacts the contact portion 22 when the seat cushion frame 17 is disposed at the highest position, the reaction force of the load applied to the seat cushion frame 17 may be directly applied to the occupant. In this respect, according to the above configuration, the gap SZ between the end surface 49 of the projecting portion 48 and the contact portion 22 allows the side wall 20 and the contact portion 22 to be deformed. Thus, the load applied to the seat cushion frame 17 is damped by the deformation of the seat cushion frame 17. As a result, the reaction force of the load is also reduced. In this way, it is possible to suppress the impact applied to the occupant.

(5) More preferably, the end surface 49 of the projecting portion 48 of the front link 15 includes the curved surface including a part of the circumference of the circle centered on the second front rotation axis C4. According to this configuration, in the raising and lowering of the seat cushion frame 17, it is possible to extend the range in which the distance between the end surface 49 of the projecting portion 48 and the contact portion 22 is constant. Thus, it is possible to obtain the effect of suppressing the deformation of the seat cushion frame 17 due to the contact between the contact portion 22 and the projecting portion 48 over a predetermined range in the raising and lowering of the seat cushion frame 17.

Other Embodiments

The above embodiment is not limited to the above-exemplified configuration. The above embodiment can be modified as follows. In the following modification, in the description of the configuration that has not been substantially changed from the configuration of the above embodiment, the same reference numerals as those used in the configuration of the above embodiment are used.

Figure 9:
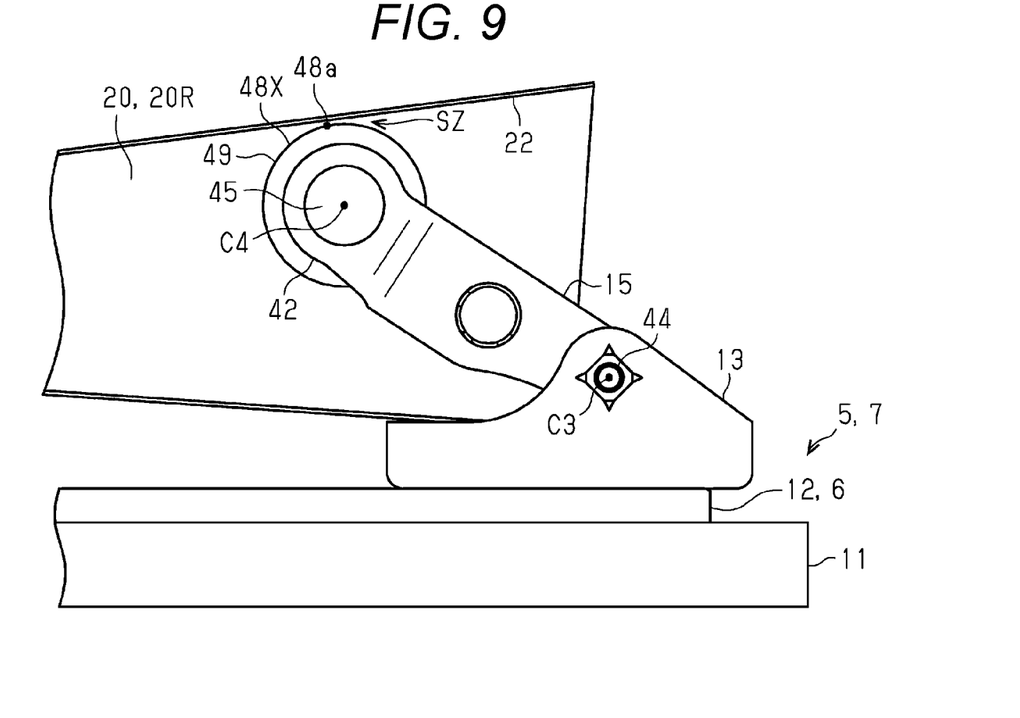
FIG. 9 is a cross-sectional view of the seat apparatus including a modification of a projecting portion.

As illustrated in FIG. 9, a projecting portion 48X may be provided to surround the second end portion 42 of the front link 15. The end surface 49 of the projecting portion 48X of the front link 15 is the curved surface including a part of the circumference of the circle centered on the second front rotation axis C4. The end surface 49 of the projecting portion 48X extends over a range of 30 degrees or more about the second front rotation axis C4. Specifically, the projecting portion 48X is configured such that the predetermined portion 48a of the projecting portion 48X faces the contact portion 22 at least when the seat cushion frame 17 is moved to the highest position.

In this embodiment, the projecting portion 48 is formed integrally with the front link 15. The projecting portion 48 may be formed of a member different from the front link 15. In this case, the projecting portion 48 is connected to the front link 15 by welding or rivet.

In the seat apparatus 1, the projecting portion 48 is provided on the front link 15. In addition to this configuration, the rear link 16 may be provided with a projecting portion having a structure similar to that of the projecting portion 48. Further, while the rear link 16 is provided with the projecting portion having the structure similar to that of the projecting portion 48, the projecting portion 48 of the front link 15 may be omitted.

In the embodiment, in the seat apparatus 1, the projecting portion 48 is provided on each of the pair of front links 15. However, the projecting portion 48 or the projecting portion having the structure similar to that of the projecting portion 48 may be provided on at least one of the pair of front links 15 and at least one of the pair of rear links 16. In this case, the contact portion 22 provided on the side wall 20 may be provided at least to correspond to the link in which the projecting portion 48 is provided. Even in this case, the effect according to the present technology can be obtained.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A seat apparatus comprising:
a plurality of links configured to be attached to a base member;
a seat cushion frame supported by the plurality of links; and
a connecting member, wherein
the seat cushion frame includes a pair of side walls connected by the connecting member, and a contact portion provided on at least one of the pair of side walls,
at least one of the plurality of links includes a first end portion, a second end portion, and a projecting portion projecting from the second end portion,
the first end portion is configured to be rotatably connected to the base member directly or indirectly about a first rotation axis,
the second end portion is configured to be rotatably connected to the side wall directly or indirectly about a second rotation axis, and
the projecting portion is configured such that at least when the seat cushion frame is moved to the highest position, a predetermined portion of the projecting portion faces the contact portion and, when the seat cushion frame sinks due to a vehicle collision, the contact portion contacts the projecting portion, allowing deformation of one or more of the side wall or the contact portion and suppressing deformation of other portions of the seat cushion frame.

2. The seat apparatus according to claim 1, wherein the projecting portion projects to intersect a straight line connecting the first rotation axis and the second rotation axis.

3. The seat apparatus according to claim 1, wherein a gap is provided between the projecting portion of the link and the side wall of the seat cushion frame.

4. The seat apparatus according to claim 1, wherein when the seat cushion frame is disposed at the highest position, a predetermined portion of the projecting portion of the link is closest to the contact portion, and a gap is generated between an end surface of the projecting portion and the contact portion.

5. The seat apparatus according to claim 1, wherein an end surface of the projecting portion of the link is made of a curved surface including a part of a circumference of a circle centered on the second rotation axis.

6. A seat apparatus comprising:
a plurality of links configured to be attached to a base member;
a seat cushion frame supported by the plurality of links; and
a connecting member, wherein
the seat cushion frame includes a pair of side walls connected by the connecting member, and a contact portion provided on at least one of the pair of side walls,
at least one of the plurality of links includes a first end portion, a second end portion, and a projecting portion projecting from the second end portion,
the first end portion is configured to be rotatably connected to the base member directly or indirectly about a first rotation axis,
the second end portion is configured to be rotatably connected to the side wall directly or indirectly about a second rotation axis,
the projecting portion is configured such that at least when the seat cushion frame is moved to the highest position, a predetermined portion of the projecting portion faces the contact portion, and
the projecting portion is bent above the second rotation axis in a direction toward the first rotation axis.

7. A seat apparatus comprising:
a plurality of links configured to be attached to a base member;
a seat cushion frame supported by the plurality of links; and
a connecting member, wherein
the seat cushion frame includes a pair of side walls connected by the connecting member, and a contact portion provided on at least one of the pair of side walls,
at least one of the plurality of links includes a first end portion, a second end portion, and a projecting portion projecting from the second end portion,
the first end portion is configured to be rotatably connected to the base member directly or indirectly about a first rotation axis,
the second end portion is configured to be rotatably connected to the side wall directly or indirectly about a second rotation axis,
the projecting portion is configured such that at least when the seat cushion frame is moved to the highest position, a predetermined portion of the projecting portion faces the contact portion, and
the projecting portion is bent above the second rotation axis in a direction away from the side wall.

* * * * *